Patented Sept. 17, 1946

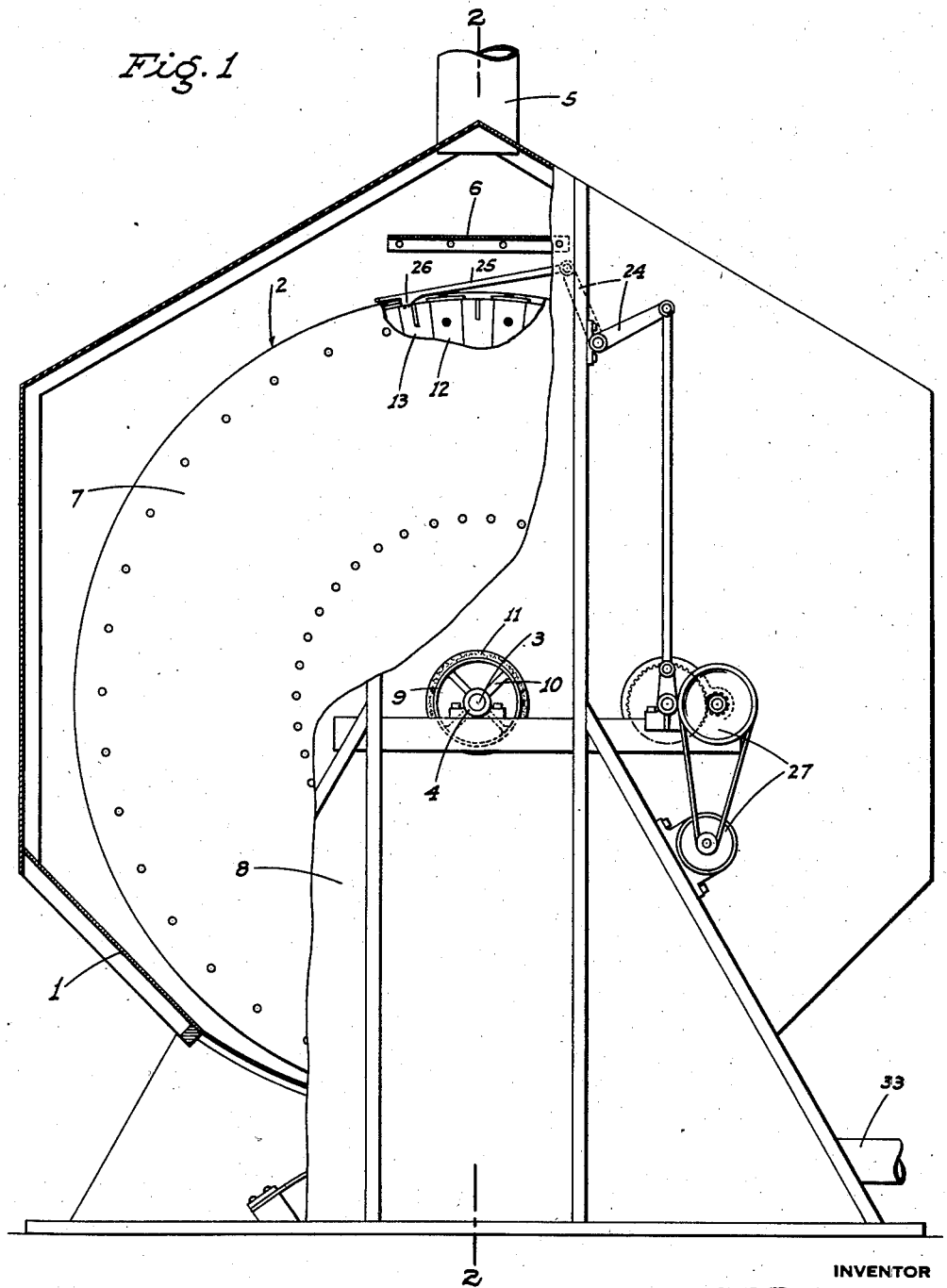

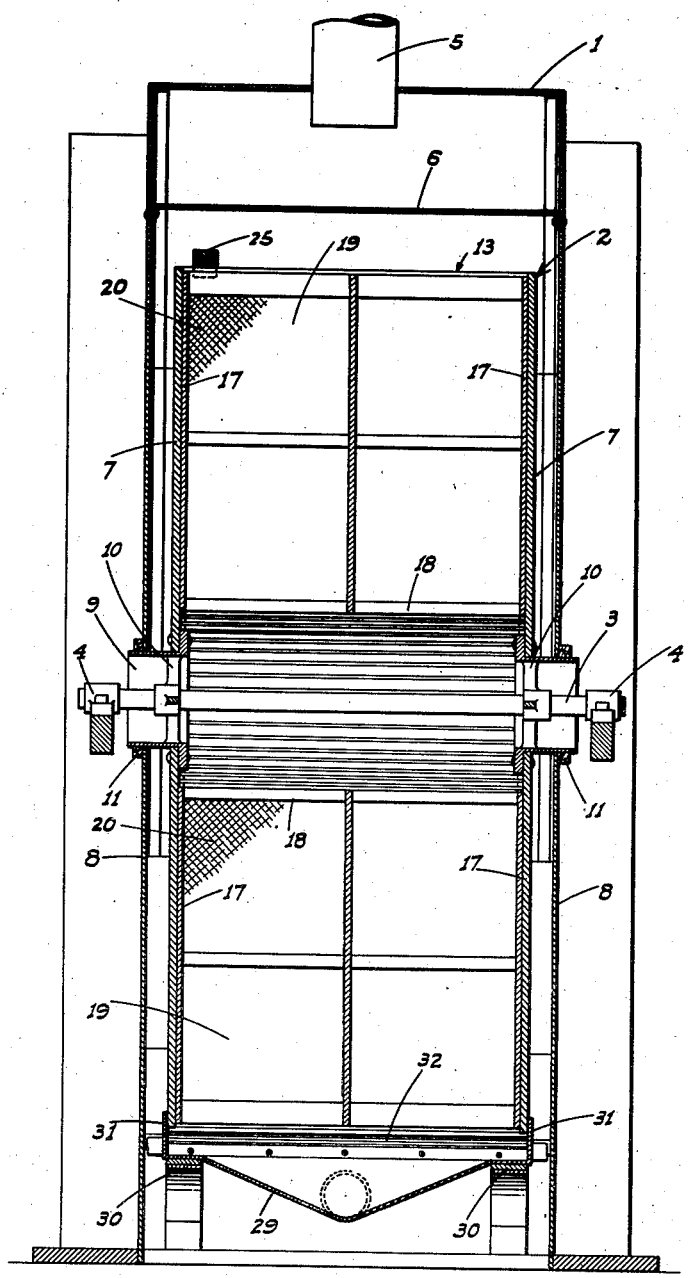

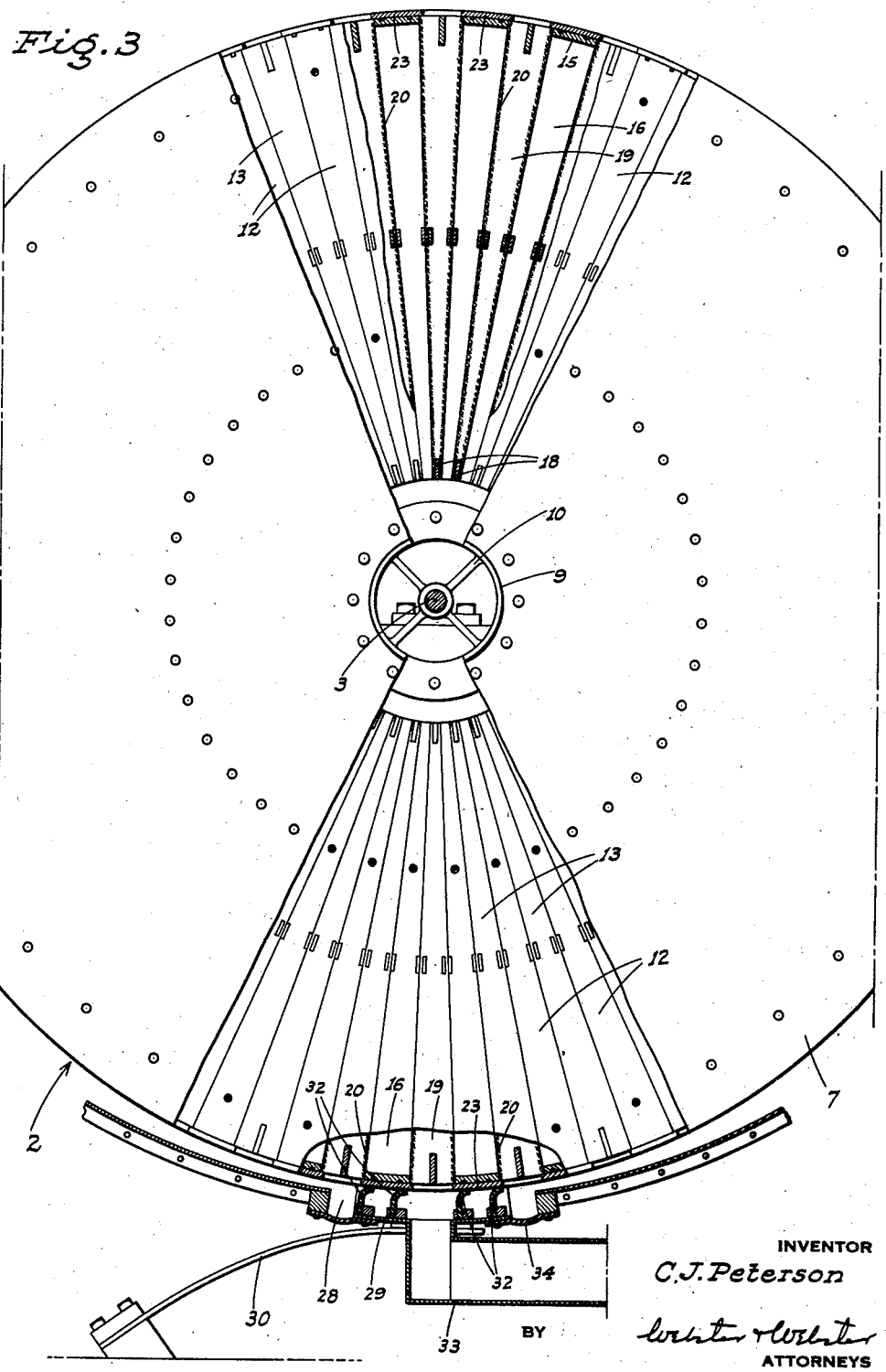

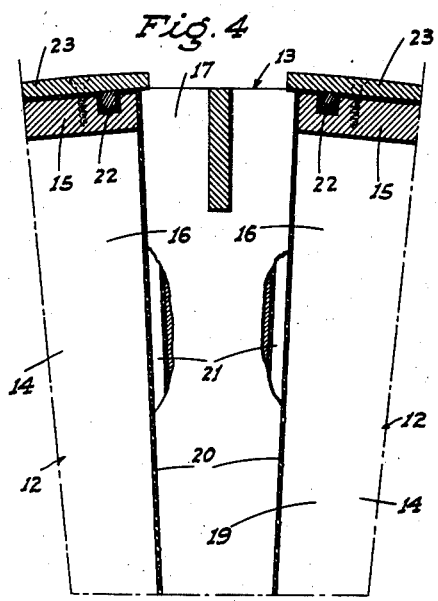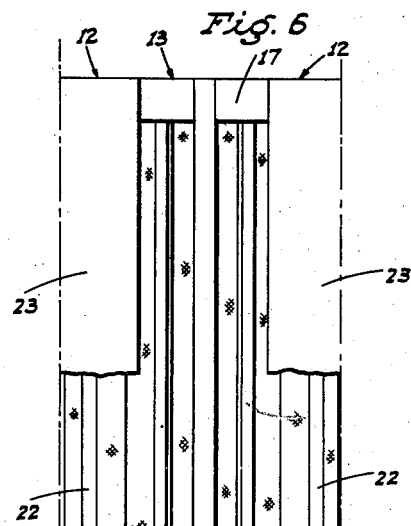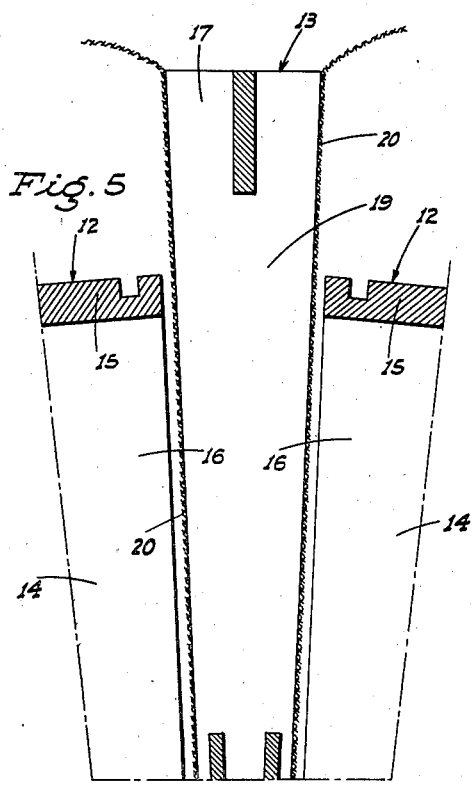

2,407,722

UNITED STATES PATENT OFFICE 2,407,722

DUST COLLECTOR

Clarence J. Peterson, Kingsburg, Calif., assignor to Kingsburg Cotton Oil Co., Kingsburg, Calif., a corporation of California Application September 18, 1944, Serial No. 554,615

7 Claims. (Cl. 183—57)

This invention relates in general to and it is an object to provide, a novel apparatus for removing and recovering for disposal, dust from the air outlets of machines which discharge large quantities of dust along with vented air; the apparatus, while being readily adaptable to many uses, being especially designed for use in connection with the air vent from feed mills where alfalfa and the like is ground into feed meal.

A further object of the invention is to provide a dust collector which is continuous in operation both as to the dust removal from the vented air, and the recovery of the dust for disposal or use, depending on the nature thereof.

An additional object of this invention is to provide a dust collector which embodies a novel dust collecting rotor, and vacuum means to remove the collected dust from the rotor at a predetermined point in the path of rotation thereof.

Another object of the invention is to provide a dust collector, as in the preceding paragraph, wherein the rotor is enclosed in a housing into which the dust bearing air is fed under pressure; the rotor including a plurality of radially disposed segmental pockets in side by side relation, adjacent pockets being open at opposite ends, one to the periphery of the rotor and the other to a central or axial duct which leads to atmosphere, and a wall between adjacent pockets pervious to air but impervious to dust whereby the dust accumulates in the peripherally open pockets and the air escapes through said walls and out the duct.

It is also an object to provide a dust collector as above wherein the pockets are formed by alternately fixed and removable frames; the frames forming the peripherally open pockets being removable and carrying therewith the air pervious, dust collecting walls, which are of a fabric such as muslin.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of the apparatus, partly broken away.

Figure 2 is a cross section on line 2—2 of Fig. 1.

Figure 3 is an enlarged fragmentary elevation of the dust collecting rotor, partly broken away.

Figure 4 is a fragmentary, enlarged section showing the outer portion of one of the removable frames and the manner of normally securing it in place.

Figure 5 is a similar view but showing the removable frame partly withdrawn from the rotor.

Figure 6 is a fragmentary peripheral view of the rotor, partly in section and partly broken away.

Referring now more particularly to the characters of reference on the drawings, the apparatus comprises an upstanding housing 1 which encloses in clearance relation, a dust collecting rotor 2 which is supported for rotation in the housing 1 by means of a horizontal center shaft 3 carried in suitable journals 4. The rotor is of substantially greater diameter than axial extent, as shown.

At a point above the rotor the housing 1 is provided with a vertical conduit 5 through which the dust laden air is adapted to be fed under some but relative low pressure, and a cross baffle 6 in the housing between the rotor and conduit 5 diffuses the incoming air stream in the housing and about the periphery of the rotor.

The rotor 2 comprises circular side plates 7 which run relatively close to the corresponding sides 8 of housing 1; said side plates 7 being ported at the center and carried on tubular hubs 9 which are in turn supported by spiders 10 from shaft 3. The tubular hubs 9 project in turnable relation through the sides 8 of the housing through seals 11, and serve as air escape ducts between the rotor at the center and atmosphere.

Between the side plates 7 the rotor comprises a plurality of matching, radially extending segmental frames, alternate ones of which are indicated generally at 12 and 13; these frames being of limited circumferential extent, with the frames 12 fixed in the rotor and the frames 13 removable as will hereinafter appear in greater detail.

The fixed frames 12 each include opposite side members 14 secured to the sides of the rotor and a cross member 15 at the outer end whereby said frames 12 define pockets 16 which are closed at the outer end and open at their inner end to the center of the rotor and air escape ducts 9.

The removable frames 13 each include opposite side members 17 engaging but free from the sides of the rotor and a cross member 18 at their inner end whereby said frames 13 define pockets 19 which are open at their outer ends and closed at their inner ends.

It will thus be seen that the pockets formed by frames 12 and 13 alternately open to the center of the rotor and the periphery thereof.

The removable frames 13 are faced on both sides with dust collecting walls 20 formed of sheets of fabric such as muslin of a mesh which is pervious to air but impervious to the dust; such fabric sheets separating adjacent pockets 16 and 19 from each other. These sheets are secured along opposite edges to the side members 17 of frames 13 by means of removable keys 21 seating in matching grooves in said members while at their outer ends the sheets lap the cross members 15 of the fixed frames and are held in place by removable cross keys 22 seated in matching grooves in said members 15.

The frames 13 are normally held against removal by means of end plates 23 on the rotor at the outer end of each fixed frame 12; the plates overhanging the outer ends of frames 13 only sufficient to retain the latter in place and thus do not obstruct the outer open ends of pockets 19.

The rotor is rotated in relatively slow step by step movement by the mechanism shown in Fig. 1, which comprises an offset bell crank assembly 24 pivotally connected to a push arm 25, disposed tangentially of the rotor; the bell crank assembly being rocked back and forth so as to slowly reciprocate the push arm 25, the latter including a catch 26 which engages the end plates successively as the arm reciprocates. The assembly 24 is rocked by the power mechanism indicated generally at 27 which is mounted exteriorly of the housing 1.

When the above described apparatus is in operation the dust laden air enters the housing under some pressure, strikes the baffle or deflector 6 and diffuses in said housing. As it is under pressure the air seeks escape and thus flows into open ended pockets 19, through the air pervious walls 20, into pockets 16 and thence escapes to the center of the rotor and out of ducts 9; the dust being filtered from the air by the dust impervious walls 20 and is thus accumulated and retained in the pockets 19.

At the bottom of the rotor the accumulated dust is withdrawn by vacuum from the pockets 19 successively and by means of the following arrangement:

At the bottom the housing 1 is formed with a transverse port 28 through which a vertically movable suction head 29 projects from below; such suction head being supported by and urged upwardly by a pair of transversally spaced leaf springs 30. This head includes upstanding end flanges 31 slidably cooperating with the sides of the rotor and flexible sealing aprons 32 in pairs, which ride the periphery of the rotor from side to side thereof; the spacing of said pairs of aprons being such that only one pocket 19 registers therebetween at a time, and a vacuum conduit 33 leads to the head between said pairs of aprons. The head 29 is sealed with the housing about the part 28 by flexible curtains 34.

With each step by step movement of the rotor, pockets 19 successively register with the head 29; the aprons 32 then bearing against the plates 23 of adjacent frames 12.

The vacuum from conduit 33 then causes an air flow from pockets 16 into pockets 19 drawing the accumulated dust from the latter into conduit 33 for disposal or recovery.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A dust collector comprising a housing into which dust laden air is adapted to be fed under pressure, a driven rotor turnably mounted in the housing, means forming an air vent duct from the center of the rotor to atmosphere outside the housing, a plurality of alternately fixed and removable, radial frames included in the rotor in adjacent side by side relation, the fixed frames forming pockets open only to the duct, the removable frames forming pockets open only to the housing, a wall pervious to air but impervious to dust mounted between and separating adjacent pockets, and means cooperating at one point with the rotor at the periphery thereof to withdraw accumulated dust from the pockets open to the housing.

2. A dust collector comprising a housing into which dust laden air is adapted to be fed under pressure, a driven rotor turnably mounted in the housing, means forming an air vent duct from the center of the rotor to atmosphere outside the housing, a plurality of alternately fixed and removable, radial frames included in the rotor in adjacent side by side relation, the fixed frames forming pockets open only to the duct, the removable frames forming pockets open only to the housing, a wall pervious to air but impervious to dust mounted between and separating adjacent pockets, and means cooperating at one point with the rotor at the periphery thereof to withdraw accumulated dust from the pockets open to the housing; said walls comprising fabric sheets and said sheets being carried by the removable frames.

3. A dust collector as in claim 2 including end members removably attached to the periphery of the rotor at the ends of the fixed frames; said end members partially overhanging the removable frames at the outer ends of the latter and normally preventing removal thereof.

4. A dust collector comprising a housing into which dust laden air is adapted to be fed under pressure, a driven rotor turnably mounted in the housing, means forming an air vent duct from the center of the rotor to atmosphere outside the housing, a plurality of radially extending, segmental frames in the rotor in engaged matching relation, said frames being closed at their outer and inner ends alternately whereby to form circumferentially adjacent, radially extending pockets open only to the duct and into the housing respectively, fabric walls secured in connection with certain of said frames separating said adjacent pockets, the walls being pervious to air and impervious to dust, and means to withdraw accumulated dust from the pockets which open into the housing.

5. A dust collector comprising a housing into which dust laden air is adapted to be fed under pressure, a driven rotor turnably mounted in the housing, means forming an air vent duct from the center of the rotor to atmosphere outside the housing, a plurality of radially extending, segmental frames in the rotor in engaged matching relation, said frames being closed at their outer and inner ends alternately whereby to form circumferentially adjacent, radially extending pockets open only to the duct and into the housing respectively, fabric walls secured in connection with certain of said frames separating said adjacent pockets, the walls being pervious to air and impervious to dust, and means to withdraw accumulated dust from the pockets which open into the housing; said frames being alternately fixed and removable relative to the rotor, and the removable frames carrying said fabric walls.

6. A dust collector comprising a housing into which dust laden air is adapted to be fed under pressure, a driven rotor turnably mounted in the housing, a plurality of circumferentially spaced dust collecting pockets formed in and open to the periphery of the rotor, and means cooperating with the rotor periphery at a predetermined point operative to successively communicate with the pockets and withdraw and carry away accumulated dust therefrom; said means including a suction head, a suction conduit leading to said head, spring means urging the suction head toward the periphery of the rotor, and sealing means on the head riding the rotor adapted to provide sealed communication of the head with said pockets successively.

7. A dust collector comprising a housing into which dust laden air may be discharged, a driven rotor turnably mounted in the housing, means forming an air vent duct leading from the center of the rotor to outside the housing, means forming a plurality of substantially radial pockets in the rotor, alternate pockets opening only into said housing adjacent the periphery of the rotor and the intermediate pockets opening only into said duct, a wall pervious to air but impervious to dust mounted between and separating adjacent pockets, means maintaining a suction at one point in the periphery of the rotor, whereby the pockets which open into the casing will intermittently pass such suction point, the suction then functioning to withdraw and carry away dust from such pockets; such suction means including a spring-pressed suction head mounted through the wall of the casing for relative movement toward the rotor, spaced apart flexible sealing aprons on the head and frictionally engaging the periphery of the rotor, the space between the aprons being such as to open communication between a selected number of such pockets and such head, and a suction conduit leading from such head.

CLARENCE J. PETERSON.